(12) United States Patent　(10) Patent No.: US 9,130,371 B2
Yang　(45) Date of Patent: Sep. 8, 2015

(54) PORTABLE POWER WITH AVAILABLE AC POWER

(71) Applicant: SAMYA TECHNOLOGY CO., LTD., Taoyuan County (TW)

(72) Inventor: Fu-I Yang, Taoyuan County (TW)

(73) Assignee: Samya Technology Co., Ltd., Taoyuan County (TW)

( * ) Notice: Subject to any disclaimer, the term of this patent is extended or adjusted under 35 U.S.C. 154(b) by 470 days.

(21) Appl. No.: 13/663,981

(22) Filed: Oct. 30, 2012

(65) Prior Publication Data

US 2014/0117767 A1　May 1, 2014

(51) Int. Cl.
*B60L 1/00*　(2006.01)
*B60L 3/00*　(2006.01)
*H02G 3/00*　(2006.01)
*H02J 1/00*　(2006.01)

(52) U.S. Cl.
CPC ............... *H02J 1/00* (2013.01); *Y10T 307/685* (2013.01)

(58) Field of Classification Search
CPC ...................................................... H02J 1/00
USPC ........... 307/10.7, 11, 22, 26, 43, 77, 10.1, 75; 320/107, 109, 116, 137, 140
See application file for complete search history.

(56) References Cited

U.S. PATENT DOCUMENTS

| | | | | |
|---|---|---|---|---|
| 2007/0195558 A1* | 8/2007 | Kim et al. | ................ | 363/21.01 |
| 2007/0296277 A1* | 12/2007 | Lee et al. | ................ | 307/105 |
| 2010/0141219 A1* | 6/2010 | Li | ................ | 320/162 |
| 2010/0213892 A1* | 8/2010 | DeSanctis | ................ | 320/107 |
| 2011/0049979 A1* | 3/2011 | Yen | ................ | 307/10.1 |

\* cited by examiner

*Primary Examiner* — Rexford Barnie
*Assistant Examiner* — Rasem Mourad
(74) *Attorney, Agent, or Firm* — Rosenberg, Klein & Lee

(57) ABSTRACT

The invention relates to a portable power with available AC power comprises a power balance control circuit coupled to an output terminal of the chargeable lithium batteries, including a battery protection circuit coupled between a positive terminal of a lithium battery pack and a microcontroller, and a π-type circuit coupled to an output terminal of the battery protection circuit and including an inductance, a first capacity and a second capacity, the inductance connected between the battery protection circuit and the AC supply unit in series, the first capacity and the second capacity respectively connected to both ends of the inductance and the π-type circuit combined with the battery protection circuit for preventing an instant surge or high-current feedback which leads to the lithium battery damage. Moreover, the lithium battery pack is thin and light.

6 Claims, 5 Drawing Sheets

PORTABLE POWER WITH AVAILABLE AC POWER

BACKGROUND OF THE INVENTION

1. Field of the Invention

The invention relates to a portable power with available AC power, particularly to a boost control circuit to charge lithium batteries by a boost charging method and to an AC/DC power output modulation circuit to prevent instant surge and high-current feedback.

2. Description of the Related Art

Due to the growing popularity of portable electronic products, standby power becomes very important; therefore, portable power is made for the portable electronic products.

The portable power is composed of lithium batteries which should be well-protected while using the portable power. For example, when there is an instant surge or high-current feedback, power from the batteries will be cut by a protection circuit.

FIG. 1 illustrates a battery protection circuit 10 connected to a battery pack B, comprising, a control module 11 and a Metal-Oxide-Semiconductor Field-Effect Transistor, hereinafter referred to as MOSFET circuit module 12. The MOSFET circuit module 12 includes a discharge MOSFET 121 and a charge MOSFET 122. The control module 11 is provided for detecting charge/discharge current and voltage of the battery pack B and controlling the gates of the discharge MOSFET 121 and the charge MOSFET 122. While a DO pin 111 and CO pin 112 output high voltages, the MOSFET circuit module 12 is in an ON state and the battery pack B is charging or discharging. In the discharging process, the voltage will be gradually reduced. While the control module 12 detects the battery voltage below a preset value, the DO pin 111 outputs low voltage and the discharge MOSFET 121 is in an OFF state to cut the discharge circuit to achieve protection function. However, the battery protection circuit 10 cannot restore power supply after cutting the output power, resulting in an inconvenience use.

Moreover, the conventional portable power only provides DC power and the conventional lead-acid batteries are heavy and thick. The conventional portable power cannot be charged in the outdoor or charged by the car cigarette lighter, without a transformer.

FIG. 2 illustrates a power supply 20, comprising a capacity 21, a full-wave rectifier 22, and a π-type filter 23 connected to the full-wave rectifier 22, and an electrical product 27 connected to the π-type filter 23. The π-type filter 23 includes a resistive fuse 24, a first capacity 25 and a second capacity 26. The π-type filter 23 is connected to the resistive fuse 24 in series for filtering out clutter of AC power. When the voltage of the DC power supply exceeds the rated value, the resistive fuse 24 is damaged and power is cut off to protect the electrical product 27 connected to an output terminal of the π-type filter 23.

SUMMARY OF THE INVENTION

It is the first primary object of the present invention to provide a portable power with available AC power to combine a power balance control circuit with a battery protection circuit for preventing an instant surge and lithium battery damage.

It is the second object of the present invention to provide a portable power with available AC power to charge the lithium battery with higher power potential by a boost charging method so that the present invention can be directly charged by car cigarette lighters without a transformer.

It is the last object of the present invention to provide a portable power with available AC power to output AC power for all the electronic products and to output 5V DC power for the electronic products with an usb device such as smart phones and tablet computers.

In order to achieve the above objects, the positioning sleeve of the invention comprises: a body having a DC power input interface thereon and at least an AC socket thereon; a charge unit in the body including a microcontroller and an end thereof electronically connected to the DC power input interface; a lithium battery pack composed of a plurality of lithium batteries in series and having a positive terminal coupled to the charge unit; an AC supply unit coupled to the lithium battery pack and including a DC To AC converter coupled to the AC socket exposed on the body; a power balance control circuit coupled between the positive terminal of the lithium battery pack and the AC supply unit, including: a battery protection circuit coupled between the positive terminal of the lithium battery pack and the microcontroller; and a π-type circuit coupled to an output terminal of the battery protection circuit and including an inductance, a first capacity and a second capacity, the inductance connected between the battery protection circuit and the AC supply unit in series, the first capacity and the second capacity respectively connected to both ends of the inductance and the π-circuit combined with the battery protection circuit for preventing instant surge.

The AC supply unit further includes a switch circuit coupled to an AC/DC power output modulation circuit, a temperature controller coupled between the switch circuit and the DC To AC converter, an AC output circuit coupled between the DC To AC converter and the AC socket, a second current detector coupled to the AC output circuit and the AC socket and a second current control circuit coupled between the second current detector and the microcontroller.

The present invention further comprises a DC supply unit coupled to the lithium battery pack and the AC supply unit includes a DC To DC buck converter coupled to at least an usb port exposed on the body.

Further, the AC/DC power output modulation circuit coupled among the microcontroller, DC supply unit and AC supply unit.

Based on the features disclosed, the charge unit includes a charge control switch coupled to the DC power input interface, a boost control circuit coupled to the charge control switch, a first current detector coupled to the boost control circuit, a first current control circuit having both ends respectively coupled to the boost control circuit and the first current detector, a voltage regulator circuit having an input terminal coupled between the DC power input interface and the charge control switch and an output terminal of the voltage regulator circuit coupled to the microcontroller, and a constant voltage circuit coupled to the boost control circuit.

Further, the DC supply unit includes a third current detector having both ends respectively coupled to the DC To DC buck converter and the usb port and a third current control circuit coupled between the third current detector and the microcontroller.

Based on the features disclosed, the present invention provides a high-power portable power with available AC power and a portable power with both AC power and DC power.

DETAILED DESCRIPTION OF THE PREFERRED EMBODIMENT

First, it is understandable for skilled person that some certain words in this description and the subsequent claims are referred to specific components. Second, the components in this description and the subsequent claims are not distinguished by different terms of the components but the different functions of the components. Last, the term "include" or "comprise" in this description and the subsequent claims is referred to an open term which should be interpreted as "including, but not limited to." Besides, the term "coupled" includes direct and indirect means of electrical connection.

Figure 1:
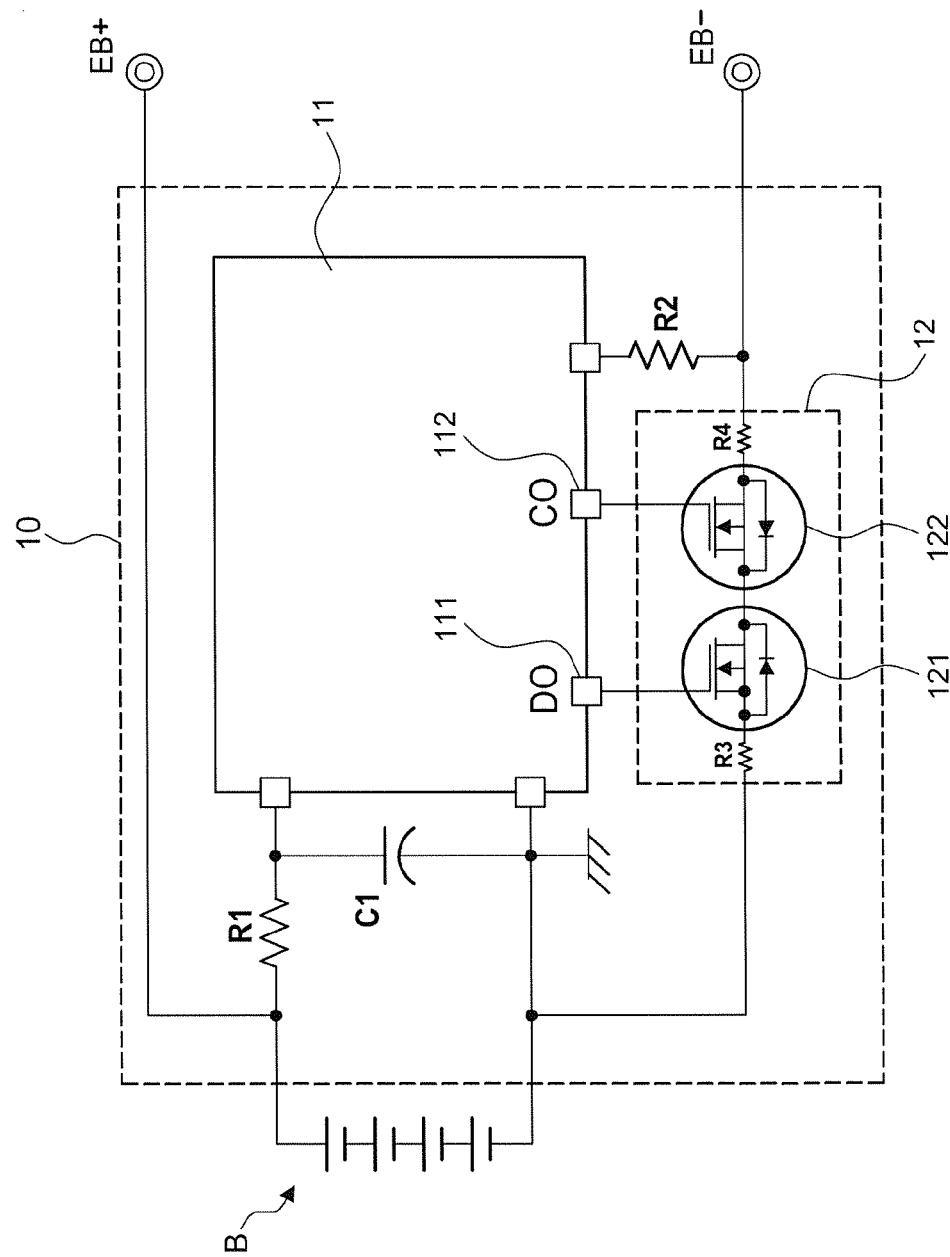
FIG. 1 is a schematic view of a conventional battery protection circuit.
Figure 2:
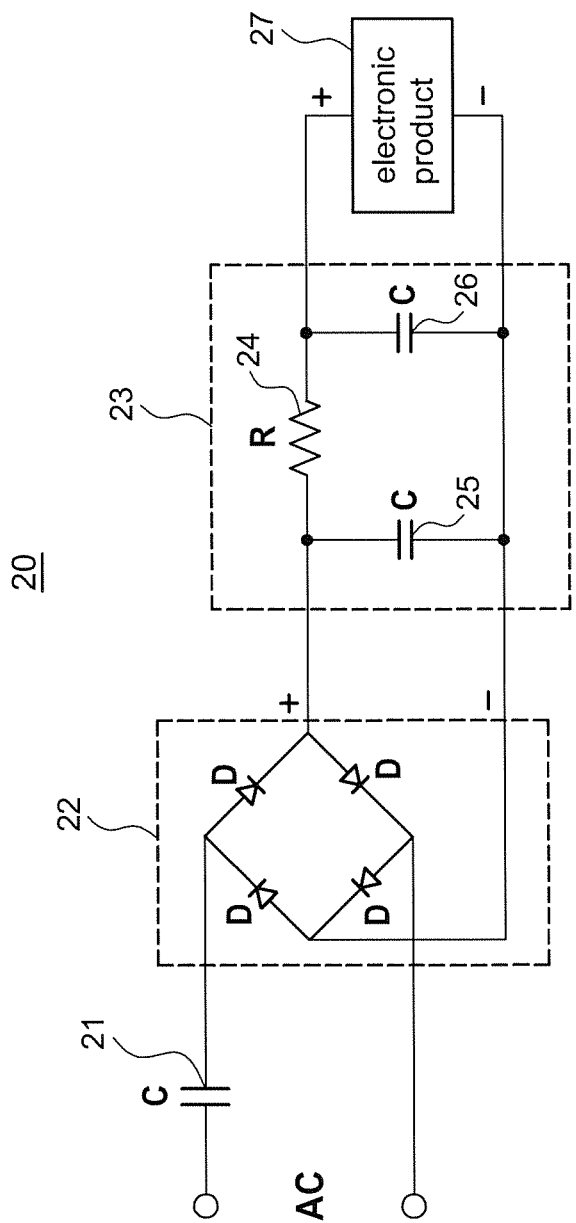
FIG. 2 is a schematic view of a conventional power supply.
Figure 3:
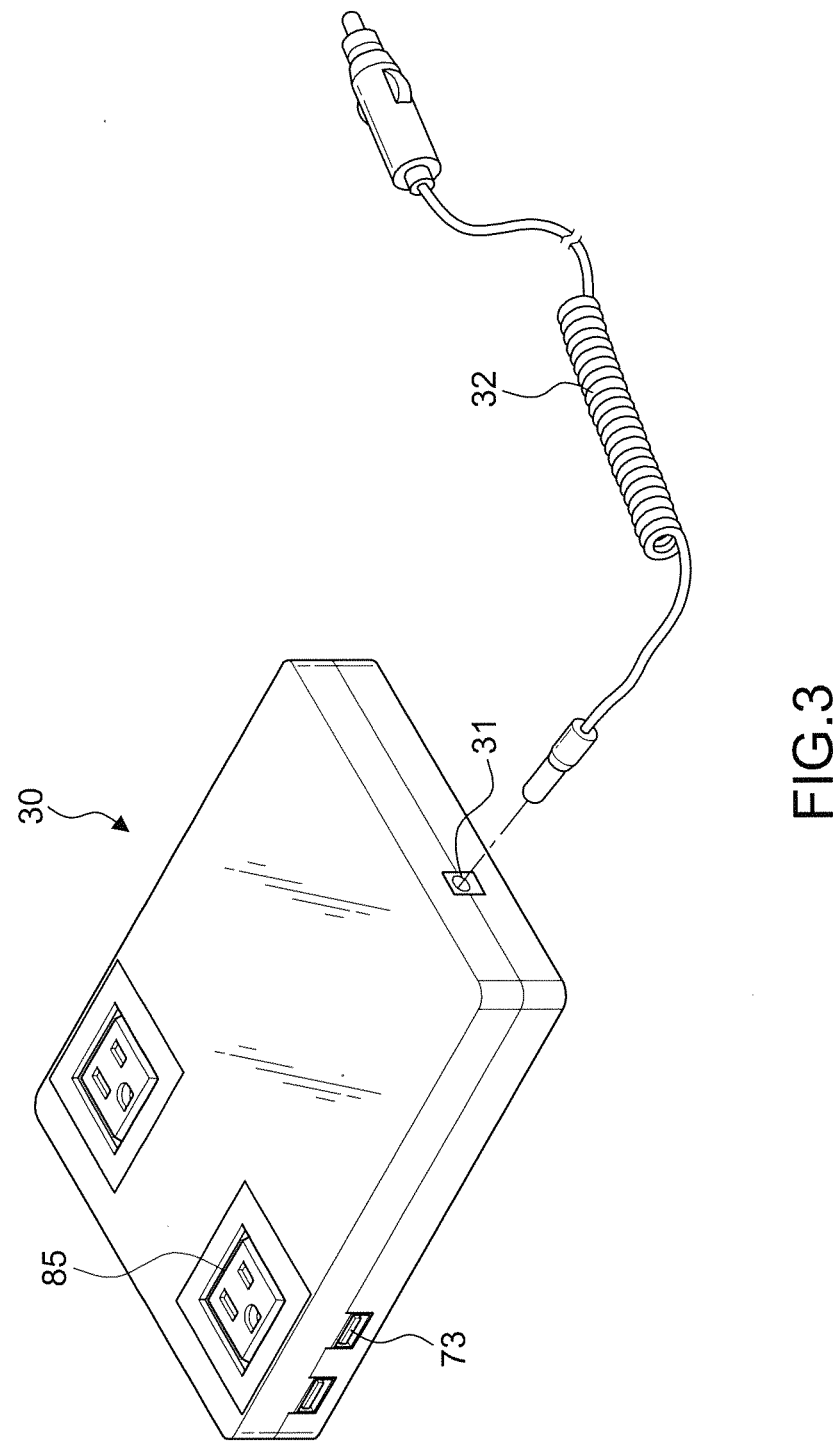
FIG. 3 is a perspective view of the preferred embodiment of the present invention.
Figure 4:
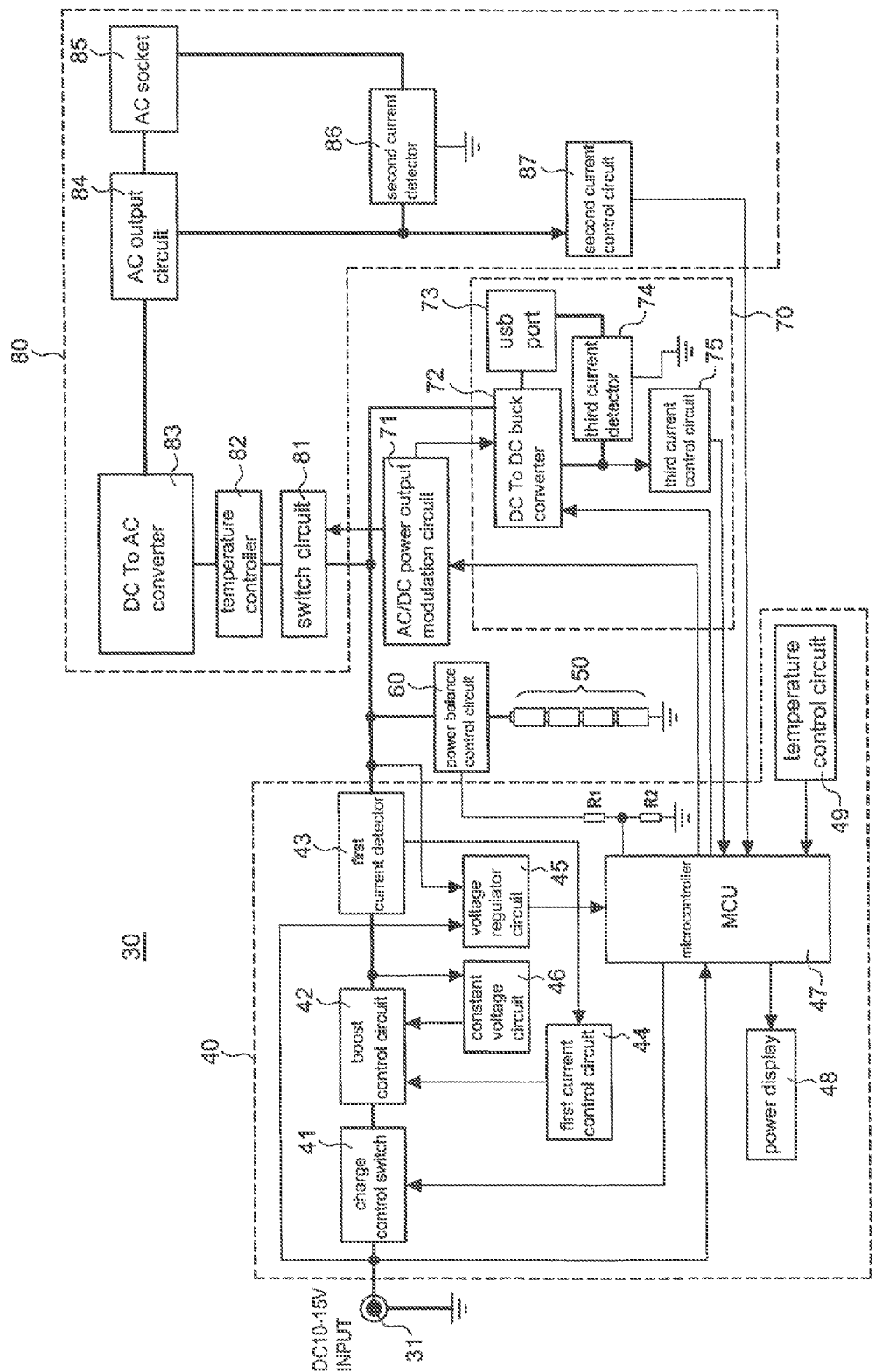
FIG. 4 is a circuit block view of the present invention.
Figure 5:
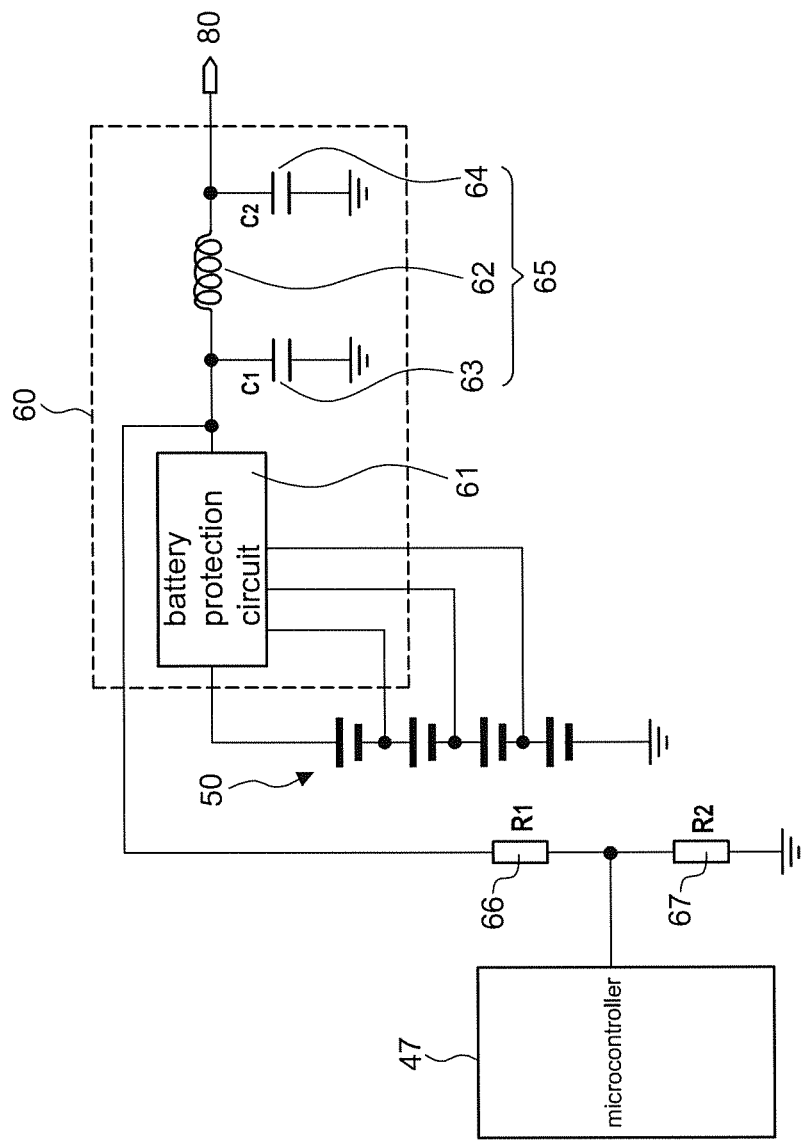
FIG. 5 is a power balance control circuit of the present invention.

Referring to FIGS. 3 through 5, the preferred embodiment of a portable power with available AC power in accordance with the present invention comprises: a body 30 having a DC power input interface 31, an usb port 73 and a AC socket 85 thereon and connected to a cigarette lighter power cord 32; a charge unit 40 arranged in the body 30 and an end thereof electronically connected to the DC power input interface 31; a lithium battery pack 50 composed of a plurality of lithium batteries in series and having a positive terminal coupled to the charge unit 40. In this embodiment, the present invention comprises a DC supply unit 70 coupled to the lithium battery pack 50 and the charge unit 40 and including a DC To DC buck converter 72 coupled to the usb port 73 exposed on the body 30. However, the portable power is a prior art and thus will not be described in details here.

With the reference to FIGS. 4 and 5, the main features of the present invention comprises an AC supply unit 80 coupled to the lithium battery pack 50 and including a DC To AC converter 83 coupled to the AC socket 85 exposed on the body 30; a power balance control circuit 60 coupled between the positive terminal of the lithium battery pack 50 and the AC supply unit 80, including: a battery protection circuit 61 coupled between the positive terminal of the lithium battery pack 50 and the microcontroller 40 and a π-type circuit 65 coupled to an output terminal of the battery protection circuit 61 and including an inductance 62, a first capacity 63 and a second capacity 64, the inductance 62 connected between the battery protection circuit 61 and the AC supply unit 80 in series, the first capacity 63 and the second capacity 64 respectively connected to both ends of the inductance 62 and the π-type circuit 65 combined with the battery protection circuit 61 for preventing instant surge. In a preferred embodiment, a first divider resistance 66 and a second divider resistance 67 may be arranged between the microcontroller 40 and the battery protection circuit 61.

With the reference to FIG. 4, the AC supply unit 80 further includes a switch circuit 81 coupled to an AC/DC power output modulation circuit 71, a temperature controller 82 coupled between the switch circuit 81 and the DC To AC converter 83, an AC output circuit 84 coupled between the DC To AC converter 83 and the AC socket 85, a second current detector 86 coupled to the AC output circuit 84 and the AC socket 85 and a second current control circuit 87 coupled between the second current detector 86 and the microcontroller 47. Further, the charge unit 40 includes a charge control switch 41 coupled to the DC power input interface 31, a boost control circuit 42 coupled to the charge control switch 41, a first current detector 43 coupled to the boost control circuit 42, a first current control circuit 44 having both ends respectively coupled to the boost control circuit 42 and the first current detector 43, a voltage regulator circuit 45 having an input terminal coupled between the DC power input interface 31 and the charge control switch 41 and an output terminal of the voltage regulator circuit 45 coupled to the microcontroller 47, and a constant voltage circuit 46 coupled to the boost control circuit 42. The charge unit 40 further includes a power display 48 and a temperature control circuit 49. Furthermore, the AC/DC power output modulation circuit 71 coupled among the microcontroller 47, DC supply unit 70 and AC supply unit 80.

Moreover, the DC supply unit 70 includes a third current detector 74 having both ends respectively coupled to the DC To DC buck converter 72 and the usb port 73 and a third current control circuit 75 coupled between the third current detector 74 and the microcontroller 47.

Based on the features disclosed, the present invention has following effects:

1. The present invention provides the power balance control circuit 60 to prevent the instant surge and high-current feedback which leads to the lithium battery damage. Moreover, comparing to the conventional lead-acid batteries, the lithium battery pack 50 is thin and light.

2. The present invention provides the boost control circuit 42 to charge the lithium battery with higher power potential by a boost charging method so that the present invention can be directly charged by a car cigarette lighter, without a transformer.

3. The present invention has both AC power output and DC power output functions to output AC power for all the electronic products and to output 5V DC power for the electronic products with an usb device such as smart phones and tablet computers.

4. The present invention provides the AC/DC power output modulation circuit 71 combined with the switch circuit 81 and the temperature controller 82 to automatically control the temperature and power modulation while outputting the AC power. Comparing to the conventional portable power having a fan for reducing the temperature, the present invention without a fan substantially reduce the temperature and reduce noise and the cost of the fan.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A portable power with available AC power, comprising:
    a body having a DC power input interface thereon and at least an AC socket thereon;
        a charge unit in the body including a microcontroller and an end thereof electronically connected to the DC power input interface;
        a lithium battery pack composed of a plurality of lithium batteries in series and having a positive terminal coupled to the charge unit;
        an AC supply unit coupled to the lithium battery pack and including a DC To AC converter coupled to the AC socket exposed on the body, the AC supply unit including a switch circuit coupled to an AC/DC power output modulation circuit, a temperature controller coupled between the switch circuit and the DC To AC converter, an AC output circuit coupled between the DC To AC converter and the AC socket, a second current detector coupled to the AC output circuit and the AC socket and a second current control circuit coupled between the second current detector and the microcontroller;

a power balance control circuit coupled between the positive terminal of the lithium battery pack and the AC supply unit, including:

a battery protection circuit coupled between the positive terminal of the lithium battery pack and the microcontroller; and a π-type circuit coupled to an output terminal of the battery protection circuit and including an inductance, a first capacity and a second capacity, the inductance connected between the battery protection circuit and the AC supply unit in series, the first capacity and the second capacity respectively connected to both ends of the inductance and the π-type circuit combined with the battery protection circuit for preventing instant surge.

2. The portable power with available AC power as claimed in claim 1, further comprising a DC supply unit coupled to the lithium battery pack and the AC supply unit and including a DC To DC buck converter coupled to at least an usb port exposed on the body.

3. The portable power with available AC power as claimed in claim 2, wherein the AC/DC power output modulation circuit coupled among the microcontroller, DC supply unit and AC supply unit.

4. The portable power with available AC power as claimed in claim 3, wherein the DC supply unit includes a third current detector having both ends respectively coupled to the DC To DC buck converter and the usb port and a third current control circuit coupled between the third current detector and the microcontroller.

5. The portable power with available AC power as claimed in claim 1, wherein the charge unit includes a charge control switch coupled to the DC power input interface, a boost control circuit coupled to the charge control switch, a first current detector coupled to the boost control circuit, a first current control circuit having both ends respectively coupled to the boost control circuit and the first current detector, a voltage regulator circuit having an input terminal coupled between the DC power input interface and the charge control switch and an output terminal of the voltage regulator circuit coupled to the microcontroller, and a constant voltage circuit coupled to the boost control circuit.

6. The portable power with available AC power as claimed in claim 5, wherein the charge unit further includes a power display and a temperature control circuit.

\* \* \* \* \*